United States Patent
Aher et al.

(10) Patent No.: US 11,508,354 B2
(45) Date of Patent: Nov. 22, 2022

(54) METHOD AND APPARATUS FOR CORRECTING FAILURES IN AUTOMATED SPEECH RECOGNITION SYSTEMS

(71) Applicant: Rovi Guides, Inc., San Jose, CA (US)

(72) Inventors: Ankur Anil Aher, Maharashtra (IN); Jeffry Copps Robert Jose, Tamil Nadu (IN)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 16/866,009

(22) Filed: May 4, 2020

(65) Prior Publication Data

US 2021/0343271 A1  Nov. 4, 2021

(51) Int. Cl.
*G10L 15/20* (2006.01)
*G10L 15/01* (2013.01)
*G10L 15/06* (2013.01)
*G10L 15/18* (2013.01)
*G10L 15/07* (2013.01)

(52) U.S. Cl.
CPC ............ *G10L 15/01* (2013.01); *G10L 15/063* (2013.01); *G10L 15/075* (2013.01); *G10L 15/1815* (2013.01); *G10L 15/20* (2013.01)

(58) Field of Classification Search
CPC ....... G10L 15/01; G10L 15/063; G10L 15/75; G10L 15/1815; G10L 15/20
USPC ......................................................... 704/275
See application file for complete search history.

(56) References Cited

U.S. PATENT DOCUMENTS

| | | | |
|---|---|---|---|
| 2007/0207567 A1* | 9/2007 | Geiss | H01L 21/8249 257/E29.174 |
| 2007/0208567 A1* | 9/2007 | Amento | G10L 15/22 704/270 |
| 2018/0033426 A1* | 2/2018 | Kapralova | G10L 15/10 |
| 2021/0074277 A1* | 3/2021 | Lewis | G06F 3/012 |

OTHER PUBLICATIONS

Disambiguation and Error Resolution in Call Transcripts Jordan Hosier*†, Vijay K. Gurbani*, Neil Milstead* Wail Systems, Inc. (Year: 2019).*

W. Byrne et al., "Automatic recognition of spontaneous speech for access to multilingual oral history archives," in IEEE Transactions on Speech and Audio Processing, vol. 12, No. 4, pp. 420-435, Jul. 2004, doi: 10.1109/TSA.2004.828702. (Year: 2004).*

Disambiguation and Error Resolution in Call Transcripts Jordan Hosiert, Vijay K. Gurbani, Neil Milstead* Vail Systems, Inc. (Year: 2019) (Year: 2019).*

* cited by examiner

*Primary Examiner* — Bharatkumar S Shah
(74) *Attorney, Agent, or Firm* — Haley Guiliano LLP

(57) ABSTRACT

Systems and methods are disclosed and described for correcting errors in ASR transcriptions. For an incorrect transcription, different words or phrases from the transcription, and/or related words or phrases, are submitted as hint words to the ASR system, and the voice query is submitted again, to determine new transcriptions. This process is repeated with different transcription terms, until a different and more proper transcription is generated. This increases the accuracy of ASR systems.

18 Claims, 8 Drawing Sheets

Determine occurrence of improper search conducted by ASR system(s)
- Whether no electronic content selected by electronic content search system as result of search
- Whether electronic content selected by electronic content search system has relevance score less than predetermined value
- Whether terms of transcription are not connected/weakly connected in knowledge graph of terms of electronic content
- Whether terms of transcription have popularity scores below predetermined value

600

Determine whether occurrence of improper search resulted from incorrect transcription
- whether a transcription score of transcription corresponding to improper search is less than predetermined value
- whether one or more terms of transcription corresponding to the improper search have homonym
- whether one or more terms of transcription corresponding to improper search have corresponding pronunciation difficulty metric greater than predetermined value
- Noise level of query
- Mispronounced term
- More than one transcription term

610

For incorrect transcription output by ASR system(s), successively submit terms associated with different subsets of terms of transcription as hint words to ASR system(s), until resulting transcription output by ASR system(s) differs from incorrect transcription

620

Submit resulting transcription to electronic content search system for selecting electronic content corresponding to resulting transcription

630

FIG. 6

METHOD AND APPARATUS FOR CORRECTING FAILURES IN AUTOMATED SPEECH RECOGNITION SYSTEMS

BACKGROUND

Embodiments of the disclosure relate generally to automated speech recognition. More specifically, embodiments of the disclosure relate to failure correction in automated speech recognition systems.

SUMMARY

Recent technological advances have allowed the somewhat widespread use of automated speech recognition (ASR) tools, by which computing devices convert speech to text without human intervention. ASR tools have proven useful in numerous applications, including voice user interfaces that rely on speech-to-text tools to convert spoken commands to text that can be interpreted, and speech-to-text processing that allows people to perform word processing tasks without typing.

ASR currently suffers from significant limitations, however. Unassisted ASR tools often suffer from limited accuracy. In particular, ASR systems often have difficulty when dealing with words that sound identical or similar yet have different meanings such as "meet" and "meat," difficult-to-pronounce words that are often spoken incorrectly to the ASR tool, mispronounced words, and noise in the speech input signal. These and other factors result in decreased accuracy of the ASR system and user frustration.

Accordingly, to overcome the lack of accuracy in ASR systems, systems and methods are described herein for a computer-based process that corrects incorrect ASR transcriptions, by successively submitting words or phrases from the transcription, along with related words and phrases, as hint words to the ASR system, until a more proper transcription is generated. This increases the accuracy of ASR systems.

In one embodiment, correction of ASR transcriptions may be implemented as part of an electronic content search system of a media playback interface. More specifically, users may submit queries such as voice queries to an electronic content search system, requesting content they may wish to view. The search system may search for and retrieve such content for the user, assisted by an ASR system which translates the user's spoken words into text that may serve as, for example, keywords of a content search. The search system may then return content results, which may be played for the user through the media playback interface.

As one example, when an incorrect transcription is output by an ASR system, terms (e.g., various words or phrases) of the transcription, along with associated terms, are successively submitted as hint words to the ASR system along with the original voice input. For instance, movie or actor names detected in the transcription, along with terms related to those movie or actor names, may be submitted as hint words. Submission of different terms continues until a resulting transcription output from the ASR system differs from the original, erroneous transcription. This new transcription may be deemed more likely to be correct, and is thus submitted to the electronic content search system, whereupon it is more likely that electronic content properly responsive to the user's query will be returned.

To avoid excessive use of ASR systems, which may be costly and/or computationally expensive, embodiments of the disclosure may first check whether errors in content searches are due to ASR transcription errors, or are due to errors elsewhere. In some embodiments, it may first be determined that an improper search was conducted by the electronic content search system, such as by detection of the search system's error messages. If an improper search has occurred, it may then also be determined whether the occurrence of the improper search resulted from an incorrect ASR transcription, and if so, the above described transcription correction processes may be implemented to successively submit different transcription terms, and associated terms, as hint words until the transcription changes.

Detection of an improper search may be conducted in any manner. In one embodiment, occurrence of improper searches may be determined according to any one or more of a number of factors, including whether no content was selected by the search system as a result of the user's query, whether content selected by the search system has a relevance score less than some predetermined value or values (i.e., whether it is deemed not relevant or not responsive to the query), whether the terms of the transcription are not connected or are weakly connected in a knowledge graph of content terms, or whether the terms of the transcription have popularity scores below some predetermined value or values.

Detection of an incorrect transcription may also be conducted in any manner. In one embodiment, occurrence of incorrect transcriptions may be determined according to any one or more of a number of factors, including whether a transcription score or metric of the transcription is less than some predetermined value or values, whether one or more terms of the transcription have a homonym and are thus likely to be the incorrect homonym, whether one or more terms of the transcription are difficult to pronounce (e.g., have a pronunciation difficulty metric greater than some predetermined value or values), whether the audio input was excessively noisy, whether one or more terms is mispronounced, or whether the transcription is a single-word transcription or a transcription containing multiple words.

If the search was not improper, i.e., if the ASR and search systems both performed correctly and valid and responsive results were returned, the system may transmit for display representations of the selected or returned content, so that the user may view these representations. For example, thumbnail images of selected content may be displayed for the user, allowing him or her to select from thumbnails for viewing.

If the search was improper but did not result from an incorrect transcription, i.e., if the improper search was not the fault of the ASR system, an error message may be generated to prompt action by other elements of the system, and/or representations of the selected content may be transmitted for display to the user. That is, results may be displayed for the user even if they are incorrect or not relevant, while the system is prompted to fix the error in some other manner. An error message may also be generated if no subset of transcription terms results in any new or different transcription. Here too, representations of the selected content may be transmitted for display to the user even if they are incorrect or not relevant, while the system is prompted to fix the error in some other manner.

In some embodiments of the disclosure, it may be possible to generate multiple different transcriptions. That is, the successive submission of different transcription terms as hint words may eventually result in more than one transcription that differs from the original incorrect transcription. In this case, the most common of these differing transcriptions may be selected and submitted to the content search system, for subsequent transmission of selected content or its representations to the user.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which:

FIGS. 6-8 are flowcharts illustrating processing steps for correcting errors in ASR systems, in accordance with embodiments of the disclosure.

DETAILED DESCRIPTION

In one embodiment, the disclosure relates to systems and methods for correcting errors in ASR transcriptions. For an incorrect transcription, different words or phrases from the transcription, and/or related words or phrases, are submitted as hint words to the ASR system, and the voice query is submitted again, to determine new transcriptions. This process is repeated with different transcription terms, until a different and more proper transcription is generated. This increases the accuracy of ASR systems.

Methods and systems of embodiments of the disclosure may be applied to, or utilized in, electronic content search systems, to improve the accuracy of results generated by voice-based searches for electronic content. Embodiments of the disclosure thus may also include initially determining whether errors or inaccuracies in such content searches result from incorrect ASR transcriptions.

Figure 1:
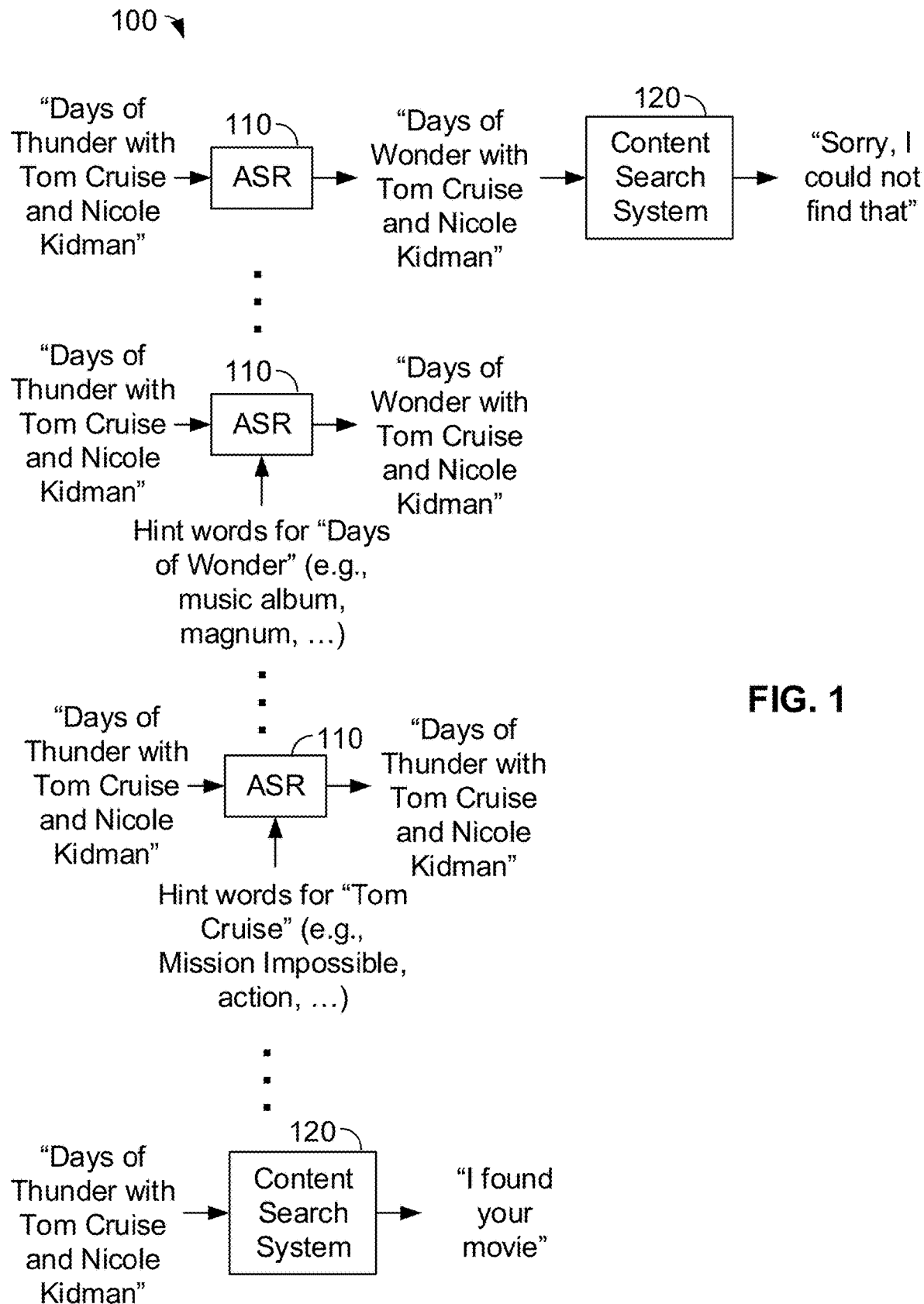
FIG. 1 illustrates operation of a system for correcting errors in ASR systems, constructed in accordance with embodiments of the disclosure.

FIG. 1 illustrates operation of a system for correcting errors in ASR systems, constructed in accordance with embodiments of the disclosure. Here, a voice-based content interface system 100 includes an ASR system 110 and a content search system 120. The ASR system 110 receives user voice queries as input, and outputs corresponding transcriptions as natural language text terms. The content search system 120 receives this text as input and conducts searches for, in this case, electronic content, with output being either selected electronic content for transmission to the user, or an error message.

In operation, system 100 may conduct an improper or non-responsive search, based on an improper transcription of the user's voice query. For example, a user may request the movie "Days of Thunder with Tom Cruise and Nicole Kidman." The ASR module 110 may inadvertently mistranscribe this request as "Days of Wonder with Tom Cruise and Nicole Kidman." In this situation, content search system 120 would not be able to find any such movie, and would accordingly return an error message such as "Sorry, I could not find that."

In response, system 100 repeatedly attempts new translations of the audio request, with each attempt using hint words derived from different terms of the improper transcription. For example, the system 100 may first attempt another transcription using the hint words "Days of Wonder" and/or any related hint words. In this case, as "Days of Wonder" may also refer to a music album by the group Magnum, related hint words input to ASR 110 may include terms such as "music album," "magnum," and the like. As these hint words are not related to the movie Days of Thunder, the resulting transcription is the same as the original incorrect transcription.

System 100 may next attempt another transcription using hint words related to a different transcription term, such as "Tom Cruise." Corresponding hint words may thus include terms such as his previous movie "Mission: Impossible," "action," and the like. As the hint words in this case direct ASR module 110 toward Tom Cruise movies, the resulting transcription may be changed to "Days of Thunder with Tom Cruise and Nicole Kidman."

As this new transcription differs from the original incorrect transcription, the new transcription is input to content search system 120. As the new transcription properly references existing content, the content search system 120 locates and returns the movie "Days of Thunder," informing the user accordingly. In this manner, successively attempting new transcriptions with different hint words based on different original transcription terms each attempt, may result in eventually determining the correct transcription, thus improving the accuracy of content searches.

Figure 2:
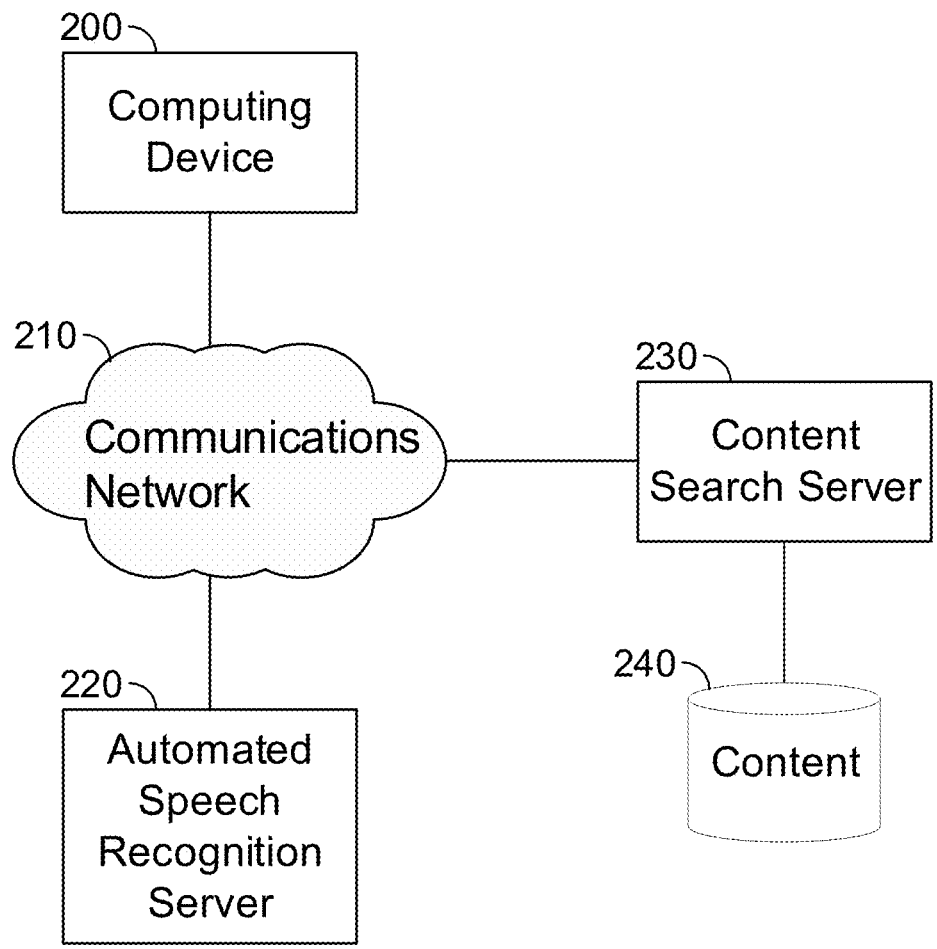
FIG. 2 is a block diagram illustration of a system for implementing correction of ASR errors in accordance with embodiments of the disclosure.

FIG. 2 is a block diagram illustration of a system for implementing correction of ASR errors, in accordance with embodiments of the disclosure. A computing device 200 may be in communication with an ASR server 220 through, for example, a communications network 210. ASR server 220 is also in electronic communication with content search server 230 also through, for example, the communications network 210. Computing device 200 may be any computing device running a user interface, such as a voice assistant, voice interface allowing for voice-based communication with a user, or an electronic content display system for a user. Examples of such computing devices are a smart home assistant similar to a Google Home® device or an Amazon® Alexa® or Echo® device, a smartphone or laptop computer with a voice interface application for receiving and broadcasting information in voice format, a set-top box or television running a media guide program or other content display program for a user, or a server executing a content display application for generating content for display or broadcast to a user. ASR server 220 may be any server running an ASR application, including modules for implementing processes of embodiments of the disclosure. Content search server 230 may be any server programmed to search for electronic content responsive to queries processed by the ASR server 220. For example, content search server 230 may be a server programmed to search content database 240 for content, and to return selected content or representations thereof to one or more of ASR server 220 or computing device 200.

The computing device 200 may be any device capable of acting as a voice interface system such as by running one or more application programs implementing voice-based communication with a user, and engaging in electronic communication with server 220. For example, computing device 200 may be a voice assistant, smart home assistant, digital TV running a content display interface, laptop computer, smartphone, tablet computer, or the like.

Figure 3:
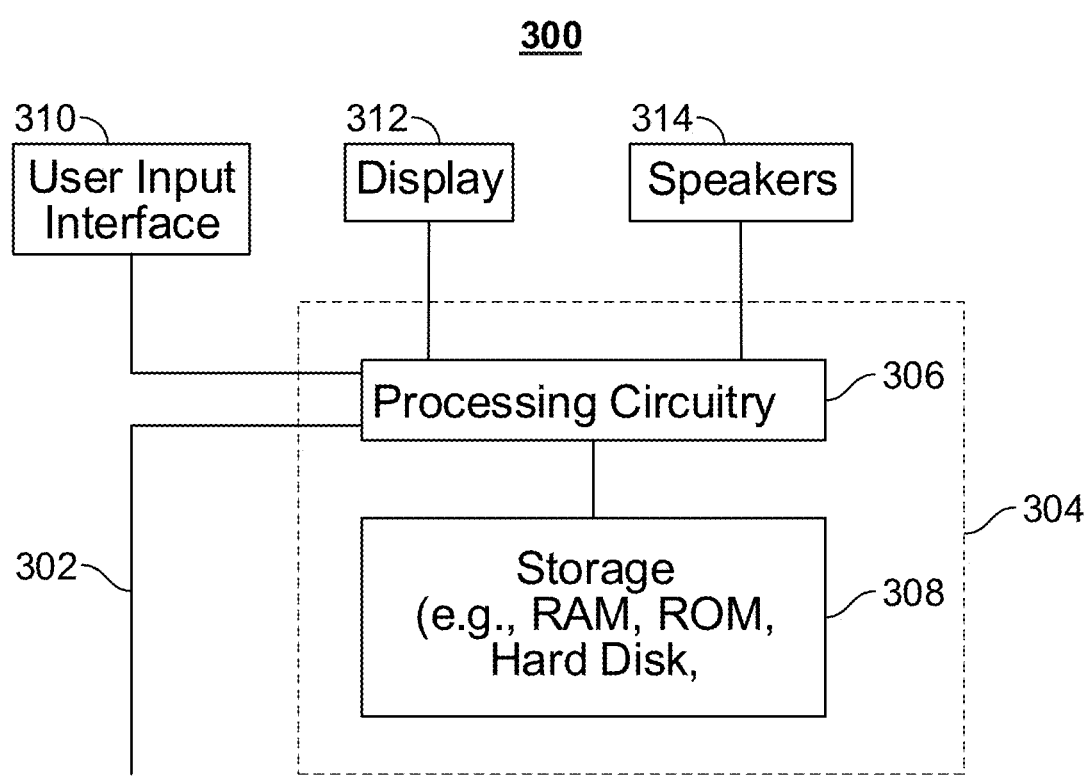
FIG. 3 is a generalized embodiment of illustrative electronic computing devices constructed for use according to embodiments of the disclosure.

FIG. 3 shows a generalized embodiment of an illustrative user equipment device 300 that may serve as a computing device 200. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths but are shown as a single path in FIG. 3 to avoid overcomplicating the drawing.

Control circuitry 304 may be based on any suitable processing circuitry such as processing circuitry 306. As referred to herein, processing circuitry should be understood to mean any circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for receiving streamed content and executing its display, such as executing application programs that provide interfaces for content providers to stream and display content on display 312.

Control circuitry 304 may thus include communications circuitry suitable for communicating with ASR server 220, content search server 230, or any other networks or servers. Communications circuitry may include a cable modem, an integrated services digital network (ISDN) modem, a digital subscriber line (DSL) modem, a telephone modem, an Ethernet card, or a wireless modem for communication with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other.

Memory may be an electronic storage device provided as storage 308, which is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage may be used to supplement storage 308 or instead of storage 308.

Storage 308 may also store instructions or code for an operating system and any number of application programs to be executed by the operating system. In operation, processing circuitry 306 retrieves and executes the instructions stored in storage 308, to run both the operating system and any application programs started by the user. The application programs can include one or more voice interface applications for implementing voice communication with a user, and/or content display applications that implement an interface allowing users to select and display content on display 312 or another display.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be included. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general-purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch-screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

Figure 4:
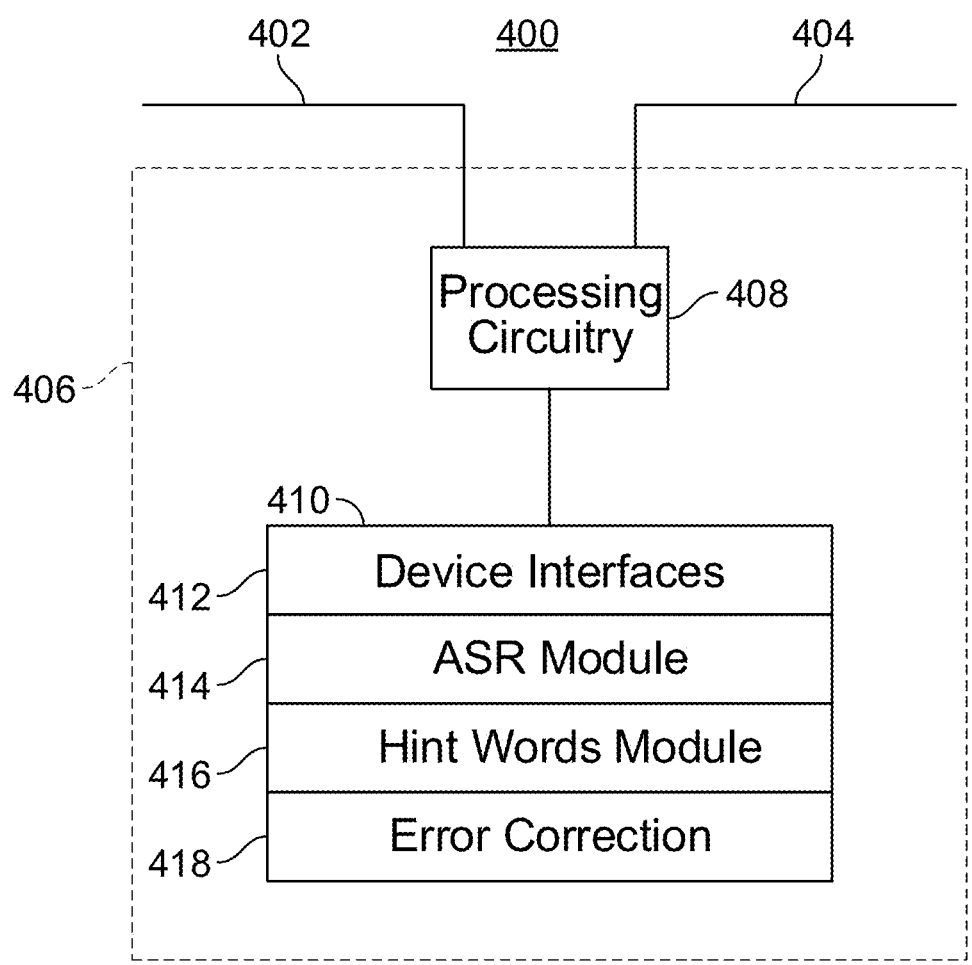
FIG. 4 is a generalized embodiment of an illustrative ASR server constructed for use according to embodiments of the disclosure.

FIG. 4 is a generalized embodiment of an illustrative ASR server 220 constructed for use according to embodiments of the disclosure. Here, device 400 may serve as an ASR server. Device 400 may receive content and data via I/O paths 402 and 404. I/O path 402 may provide content and data to the various devices 200, 230, while I/O path 404 may provide data to, and receive content from, one or more content search servers 230. Like the user equipment device 300, the device 400 has control circuitry 406, which includes processing circuitry 408 and storage 410. The control circuitry 406, processing circuitry 408, and storage 410 may be constructed, and may operate, in a similar manner to the respective components of user equipment device 300.

Storage 410 is a memory that stores a number of programs for execution by processing circuitry 408. In particular, storage 410 may store a number of device interfaces 412, an ASR module 414, hint words module 416 for determining hint words and submitting them to ASR module 414, and error correction module 418. The device interfaces 412 are interface programs for handling the exchange of commands and data with the various devices 200. ASR module 414 is one or more programs for carrying out the ASR functions described herein, e.g., transcribing voice input received from devices 200. As above, ASR module 414 determines transcriptions aided by hint words submitted by hint words module 416, and transmits the transcription to content search server 230. Hint words module 416 includes code for executing all of the above described functions for selecting hint words, including retrieving terms from transcriptions output by ASR module 414, selecting hint words therefrom, and sending the selected hint words to ASR module 414 to aid ASR module 414 in transcribing voice input. Error correction module 418 is a module for performing the above-described error correction processes, initiating successive generation of hint words by module 416 for transcription of voice input by ASR module 414 until the output transcription differs from the original erroneous transcription.

The device 400 may be any electronic device capable of electronic communication with other devices and performance of ASR error correction processes described herein. For example, the device 400 may be a server, or a networked in-home smart device connected to a home modem and thereby to various devices 200. The device 400 may alternatively be a laptop computer or desktop computer configured as above.

Figure 5:
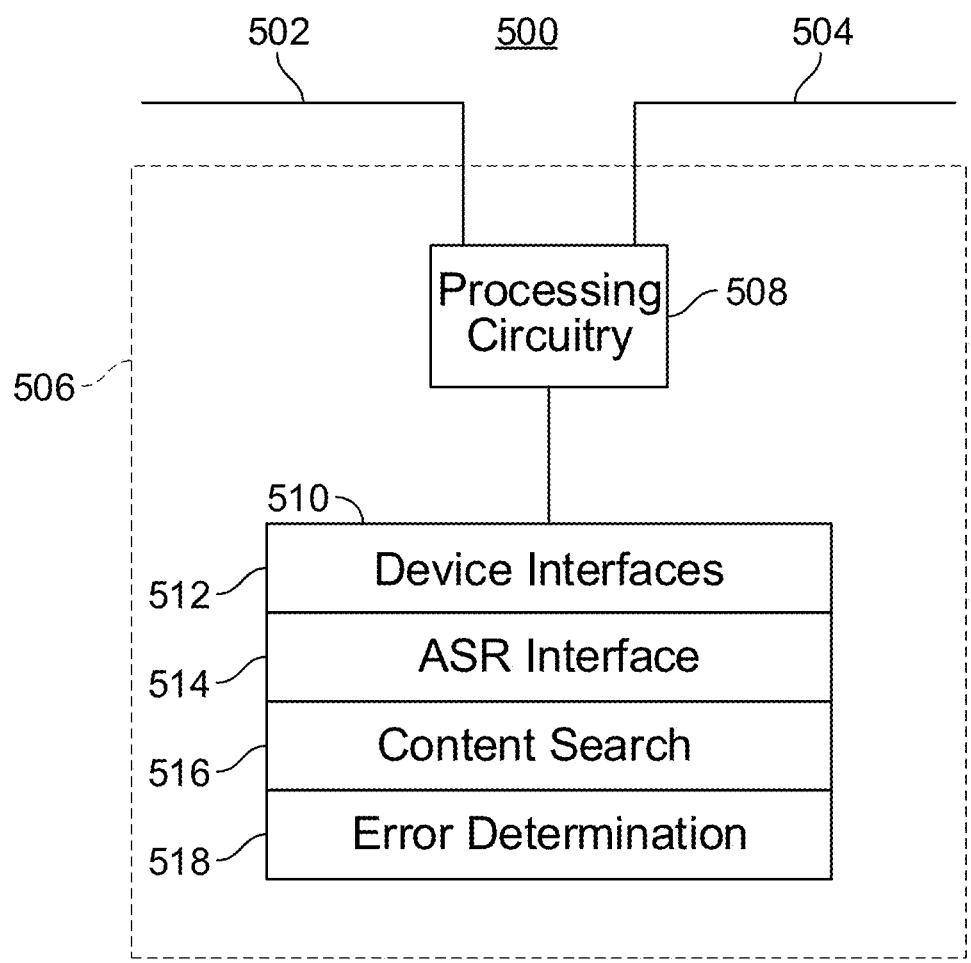
FIG. 5 is a generalized embodiment of an illustrative content search server constructed for use according to embodiments of the disclosure.

FIG. 5 is a generalized embodiment of an illustrative content search server 230 constructed for use according to embodiments of the disclosure. Here, device 500 may serve as a content search server. Device 500 may receive content and data via I/O paths 502 and 504. I/O path 502 may provide content and data to the various devices 200 and/or server 220, while I/O path 504 may provide data to, and receive content from, content database 240. Like the device 400, the device 500 has control circuitry 506, which includes processing circuitry 508 and storage 510. The control circuitry 506, processing circuitry 508, and storage 510 may be constructed, and may operate, in a similar manner to the respective components of device 400.

Storage 510 is a memory that stores a number of programs for execution by processing circuitry 508. In particular, storage 510 may store a number of device interfaces 512, an ASR interface 514, content search module 516 for searching electronic content entries stored in content database 240 according to transcribed queries from ASR server 220, and error determination module 518 for determining and transmitting errors in the search processes executed by content search module 516. The device interfaces 512 are interface programs for handling the exchange of commands and data with the various devices 200. ASR interface 514 is an interface program for handling the exchange of transcriptions, error messages, instructions, and resulting search results with ASR server 220. Content search module 516 includes code for executing all of the above-described functions for carrying out searches for electronic content, including receiving transcribed queries from ASR module 414 of ASR server 220, conducting searches of content database 240 according to the received transcriptions, and returning results and/or other data to one or more of ASR server 220 or device(s) 200. Error determination module 518 is configured to determine whether errors occur in the search processes of content search module 516, and to transmit any such error messages to appropriate devices such as ASR server 220 or device(s) 200.

Any of the various modules and functions of servers 220 and 230 may reside on any one or more devices. For example, ASR functionality and content search functionality may be combined on the same server, or even within computing device 200.

FIG. 6 is a flowchart illustrating processing steps for correcting errors in ASR systems, in accordance with embodiments of the disclosure. In particular, FIG. 6 describes the operation of servers 220 in conducting content searches responsive to voice queries. Here, error determination module 518 first determines the occurrence of an improper search conducted by the ASR system in response to a voice query submitted by a user of device 200 (Step 600). Error determination module 518 may determine the occurrence of an improper search in any manner. In some embodiments of the disclosure, errors may be determined according to a heuristic or factor-based approach using any one or more factors. One such factor may be whether no content was selected by the content search module 516 in searching the content database 240 responsive to the search text received from ASR module 414. A search that returns no results may be deemed to be an unlikely, and thus improper, search.

Another factor may be whether the electronic content selected by the search module 516 has relevance scores less than some predetermined value. Here, the presence of a number of irrelevant, or low-relevance, results may indicate a search unlikely to have been intended by the user, and may thus be considered improper. Relevance scores are known, and may be determined in any manner. Additionally, any one or more relevance scores may be employed, and compared to any one or more predetermined values that are determined in any manner.

A further factor may be whether the terms of the transcription received from ASR module 414 are either not connected or weakly connected in a knowledge graph of terms of electronic content. That is, a knowledge graph, e.g., a known graph data structure, constructed of terms used in or related to electronic content of interest, may be stored or accessible by error determination module 518. The error determination module 518 may determine the distances in this graph between various terms of the transcription it receives and, if these terms are excessively far apart or not connected (e.g., one or more transcription terms does not appear in the knowledge graph), this may weigh towards determination of an error. Determination of weak connections may be performed in any manner, such as by comparison to a predetermined distance in the knowledge graph (which may be any distance), the presence of a predetermined number of terms that are greater than some predetermined distance from one another, or the like. Such predetermined distances may be any distances, of any magnitude.

Another factor may be whether the terms of the transcription received from ASR module 414 have popularity scores below some predetermined value. That is, error determination module 518 or another suitable module may determine popularity scores for terms of the received transcription, or scores indicating how common or popular the terms are. Low popularity scores may indicate terms not often used and thus unlikely to intentionally appear in a query, thus indicating a likely mistake in the transcription or voice query. Popularity scores of terms are known, and may be determined in any manner. Further, popularity scores may be compared to any suitable predetermined value or values that may indicate uncommon or unpopular terms.

Error determination module 518 may employ these or any other factors in any manner, to determine the occurrence of an improper search. For example, any one factor may be considered dispositive as desired, or an error may be determined when greater than any predetermined number of the above or other factors are present. Alternatively, factors may each be assigned scores in any manner, and errors may be determined when the total of such scores for every factor exceeds some predetermined value or values.

If the error determination module 518 determines that the search was proper, search results may simply be delivered to the user. However, if the error determination module 518 determines that an improper search has been conducted, module 518 then determines whether the improper search resulted from an incorrect transcription, or from some other cause (Step 610). Error determination module 518 may determine an incorrect transcription in any manner. In some embodiments of the disclosure, the presence of an incorrect transcription may be determined according to a heuristic or factor-based approach using any one or more factors. One such factor may be whether a transcription score of the transcription corresponding to the improper search is less than some predetermined value. Transcription scores are known, and may include any scores characterizing the accuracy of a transcription. Here, low transcription scores may indicate a transcription that is unlikely to be correct, or likely to contain one or more erroneous terms. Any one or more transcription scores may be employed, and compared to any one or more predetermined values that are determined in any manner.

Another factor may be whether one or more terms of the transcription of an improper search have one or more homonyms, and thus were actually intended to be a different term, i.e., one of the homonyms. Words or terms with homonyms are thus more likely to be incorrect. To determine the presence of homonyms, error determination module 518 may store a list of common homonyms, and compare transcription terms to entries of this list. Alternatively, homonym detection may be performed in any other suitable manner.

A further factor may be whether one or more terms of the transcription of an improper search are difficult to pronounce, e.g., have a pronunciation difficulty metric greater than some predetermined value. Pronunciation difficulty may be measured in any manner, such as by comparing transcription terms to a stored list of difficult-to-pronounce terms, evaluating a pronunciation difficulty metric, or the like. Such metrics may be any one or more values or criteria suitable for measuring the ease of pronunciation of a term, and may include comparison of the transcription terms to stored difficult-to-pronounce syllables or letter combinations, where the pronunciation difficult metric may be determined according to the number of such syllables/letter combinations in the transcription.

An additional factor may be the noise level of the recorded audio query, where high noise levels may indicate a greater likelihood of an improper transcription. Determination of noise levels, and associated noise level metrics, are known, and embodiments of the disclosure contemplate both noise level determination and determination of excessive noise level in any manner.

A further factor may be whether any term of the transcription is a mispronounced term, as mispronounced terms may indicate an improper transcription. Mispronounced terms may be determined in any manner, such as by comparison of the transcription to stored phoneme sequences known to be mispronunciations, use of known machine learning methods for identifying mispronounced terms, and the like.

Another factor may be whether there is more than one term in the transcription, as successive submission of multiple transcription terms is not possible if only one term exists. Accordingly, a single-term transcription may be deemed, in some embodiments of the disclosure, as a correct transcription.

Error determination module 518 may employ these or any other factors in any manner, to determine that an improper search resulted from an incorrect transcription. For example, any one factor may be considered dispositive as desired (e.g., a single-term transcription), or an error may be determined when greater than any predetermined number of the above or other factors are present. Alternatively, factors may be assigned scores in any manner, and errors may be determined when the total of such scores for every factor exceeds some predetermined value or values.

If error determination module 518 has determined that an improper search occurred, and that this improper search resulted from an incorrect transcription, module 518 may then signal the ASR server 220 to perform the above-described ASR error correction methods, successively submitting terms of the transcription, and/or any associated terms, as hint words to the ASR module 414 until the resulting transcription differs from the original, incorrect transcription (Step 620). More specifically, such a signal from module 518 may prompt ASR server 220 to direct hint words module 416 to select a set of terms related to successive different terms of the incorrect transcription, and to submit these sets of terms to the ASR module 414. The ASR module 414 then re-transcribes the audio query from device 200 with each set of hint word terms, until one or more different transcriptions are produced (Step 620). Hint words module 416 may select related terms in any manner, such as by maintaining a graph of content-related terms in known manner and selecting terms within a predetermined graph distance of each successive different transcription term.

Once one or more new transcriptions are generated, one such new transcription is selected (if more than one exists) and submitted to content search server 230 so that it may search for and select content corresponding to the new transcription (Step 630). As above, search server 230 may search content database 240 or other content repositories for content matching the transcription or query it receives from ASR server 220, in known manner. Representations of selected content, such as thumbnails, previews, or the like, may then be transmitted to the device 200, perhaps via ASR server 220 if desired, for viewing and/or selection by the user.

Embodiments of the disclosure contemplate the successive submission of differing transcription terms, and associated terms, as hint words to an ASR system at any time. For example, the ASR error correction processes of embodiments of the disclosure may be performed for every search conducted by search server 230, as a verification or check. Alternatively, the ASR error correction processes of embodiments of the disclosure may be performed for every improper search, regardless of whether an incorrect transcription is deemed to be at fault. However, to conserve resources (e.g., computational overhead, power, any monetary costs associated with execution of ASR module 414, or the like) consumed by ASR error correction, some embodiments of the disclosure contemplate performance of the ASR error correction methods described herein only when an improper search has occurred, and this improper search is deemed to result from an incorrect transcription.

Figure 7:
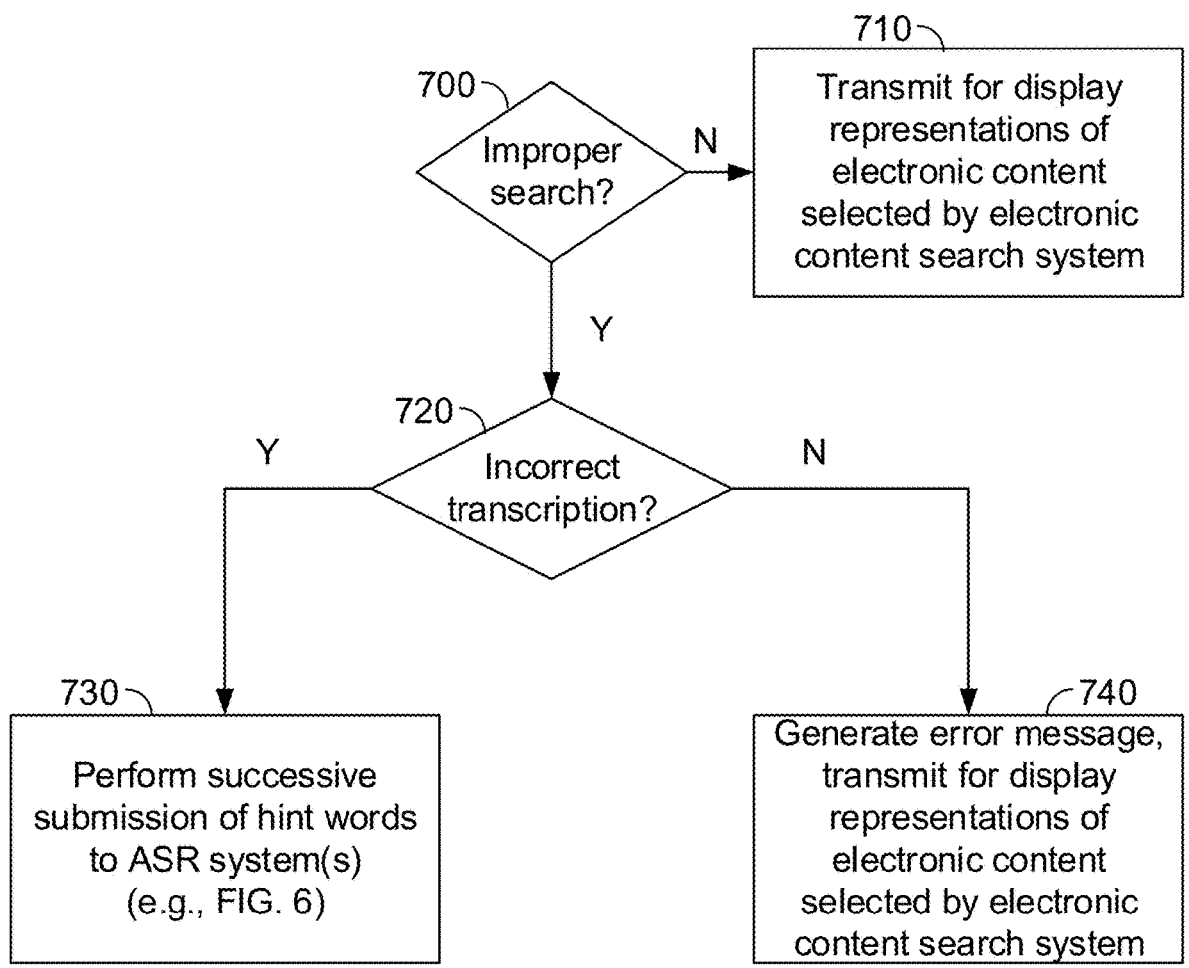

FIG. 7 is a flowchart illustrating conditional execution of ASR error correction, in accordance with some such embodiments. Initially, error determination module 518 may determine whether content search module 516 conducted an improper search (Step 700). Determination of an improper search may be conducted as described above in connection with Step 600 of FIG. 6, weighing one or more factors to determine whether a search should be considered improper or erroneous.

If the error determination module 518 determines that the search was not improper, e.g., if the search resulted in a sufficient amount of relevant content returned, the search server 230 may transmit representations of the selected content to device 200, perhaps via ASR server 220, for display by device 200 for the user (Step 710). In many content interfaces, users may then select content representations, such as thumbnail images or icons, to receive a stream of the content for viewing. Conversely, if error determination module 518 determines that the search was an improper or erroneous search, e.g., if the search resulted in no results, or the results were of poor relevance or contained excessive low-popularity content, the error determination module may then determine whether this was the fault of an incorrect transcription (Step 720). Determination of an incorrect transcription may be conducted as described above in connection with Step 610 of FIG. 6, weighing one or more factors to determine whether an incorrect transcription exists.

If the error determination module 518 determines that the transcription was accurate or correct, e.g., when the transcription has a high accuracy score, no difficult or mispronounced terms, and little associated noise, module 518 may generate an error message indicating the occurrence of an improper search (but one for which transcription was not the cause) and transmit the returned results for the user anyway. That is, the search server 230 may transmit representations of the selected content to device 200, perhaps via ASR server 220, for display by device 200 for the user (Step 740), even if the search is deemed improper, as the user is likely to be more frustrated by no results or an error message than at least some results, even if they may not be to the user's liking.

Alternatively, if the error determination module 518 determines that the transcription was inaccurate or incorrect, e.g., the transcription has a low accuracy score, several difficult-to-pronounce terms and many potential homonyms, module 518 may instruct ASR server 220 to conduct ASR correction methods of embodiments of the disclosure, e.g., as in Step 620 above, performing successive submission of transcription terms and/or related terms as hint words to the ASR module 414 (Step 730) until the resulting transcription changes. In this manner, ASR error correction processes may be performed only if an improper search has occurred and if this improper search is the result of an incorrect ASR transcription, thus preventing wasted resources in executing ASR processes unnecessarily.

As above, ASR correction processes of embodiments of the disclosure may result in more than one transcription that differs from the original erroneous transcription. That is, successively re-running the ASR module 414 using different sets of hint words for different transcription terms may result in multiple different transcriptions. In this situation, embodiments of the disclosure contemplate selection of any of these new, differing transcriptions as the correct transcription for executing a new content search. Transcription selection may be performed in any manner.

Figure 8:
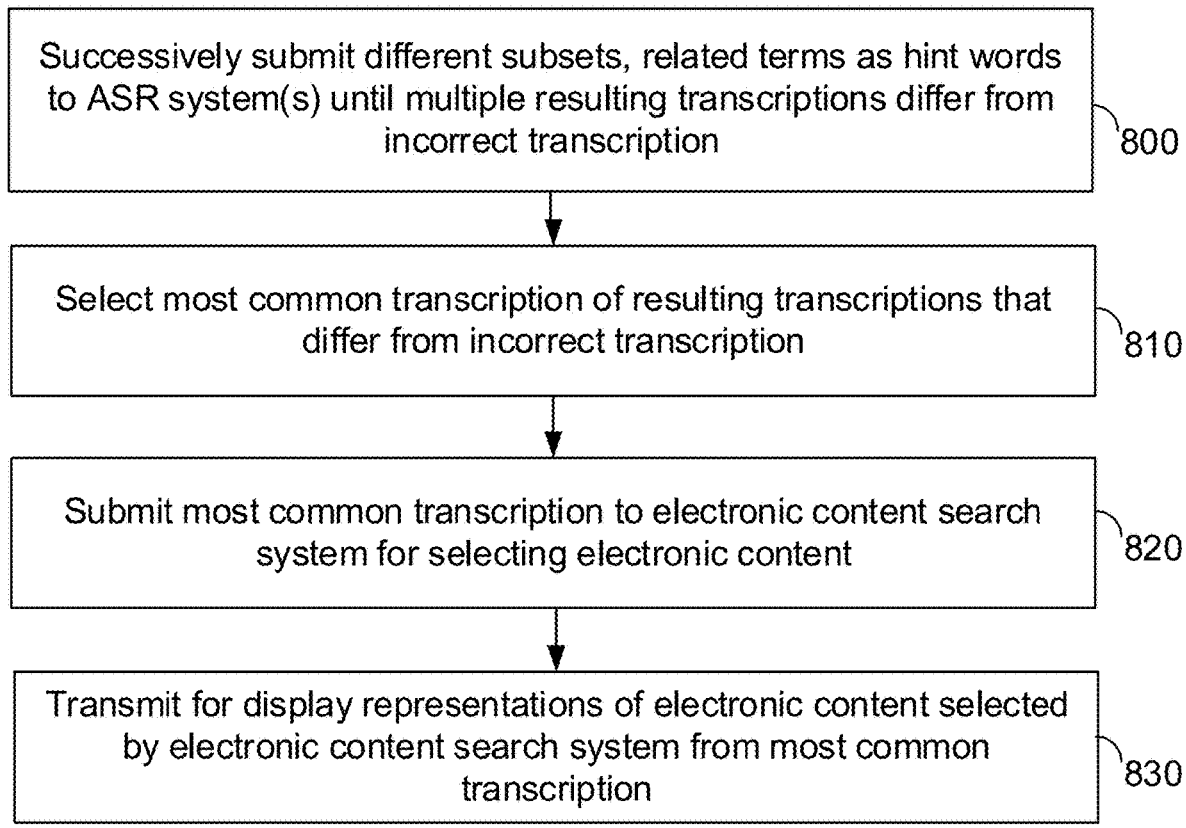

FIG. 8 is a flowchart illustrating one such approach. Here, as above, when an improper content search is detected and is determined to result from an incorrect ASR transcription, ASR server 220 may successively submit different subsets of transcription terms, and/or any related terms, as hint words to ASR module 414 until multiple resulting transcriptions differ from the original, incorrect transcription (Step 800). ASR server 220 may then select the most common of the multiple resulting transcriptions (Step 810). If only one transcription differs from the original incorrect transcription, that one transcription is selected. The selected transcription is then submitted to the content search server 230 for selection of content (Step 820). Any resulting content selections, or any representations thereof, may then be transmitted for display to the user (Step 830). Selection of the most common of the new transcriptions may increase the likelihood of selecting the correct transcription, thus improving search results.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, improper searches and incorrect transcriptions can be detected or determined in any manner, and terms related to transcription terms may also be determined in any manner. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A method of correcting errors in searches for electronic content resulting from incorrect transcriptions by an automated speech recognition system, the method comprising:
for an incorrect transcription output by one or more automated speech recognition systems, successively submitting, using control circuitry, terms associated with different subsets of terms of the transcription as hint words to the one or more automated speech recognition systems;
generating a transcription output by the one or more automated speech recognition systems differs from the incorrect transcription, wherein the transcription output differs from the incorrect transcription in a first subset of the terms of the transcription generated using hint words based on terms in a second subset of the terms of the transcription different from the first subset of the terms of the transcription;
submitting the generated transcription to an electronic content search system for selecting electronic content corresponding to the resulting transcription; and
if none of the different subsets results in a resulting transcription different from the incorrect transcription, generating an error message and generating for display representations of the electronic content selected by the electronic content search system.

2. The method of claim 1, further comprising:
determining an occurrence of an improper search conducted by the electronic content search system; and
determining whether the occurrence of the improper search resulted from the incorrect transcription.

3. The method of claim 2, wherein the determining an occurrence of an improper search further comprises determining the occurrence of an improper search according to one or more of:
whether no electronic content was selected by the electronic content search system as a result of the search;
whether electronic content selected by the electronic content search system as a result of the search has an associated relevance score less than a predetermined value;
whether the terms of the transcription are not connected or weakly connected in a knowledge graph of terms of the electronic content; or
whether the terms of the transcription have popularity scores below a predetermined value.

4. The method of claim 2, wherein the determining that the occurrence of the improper search resulted from the incorrect transcription further comprises determining the presence of the incorrect transcription according to one or more of:
whether a transcription score of the transcription corresponding to the improper search is less than a predetermined value;
whether one or more terms of the transcription corresponding to the improper search have a homonym;
whether one or more terms of the transcription corresponding to the improper search have a corresponding pronunciation difficulty metric greater than a predetermined value;
a noise level of a query resulting in the transcription corresponding to the improper search;
whether one or more terms of the transcription corresponding to the improper search is a mispronounced term; or
whether the transcription corresponding to the improper search comprises more than one term.

5. The method of claim 2, further comprising, if the electronic content search system did not generate an occurrence of the improper search, transmitting for display representations of the electronic content selected by the electronic content search system.

6. The method of claim 2, further comprising conditionally performing the successively submitting if the electronic content search system generated an occurrence of the improper search and if the occurrence of the improper search resulted from the incorrect transcription.

7. The method of claim 2, further comprising, if the electronic content search system generated an occurrence of the improper search and if the occurrence of the improper search did not result from the incorrect transcription, generating an error message and transmitting for display representations of the electronic content selected by the electronic content search system.

8. The method of claim 1, wherein the successively submitting further comprises successively submitting the different subsets as hint words to the one or more automated speech recognition systems, until multiple ones of the resulting transcriptions differ from the incorrect transcription.

9. The method of claim 8, further comprising selecting a most common transcription of the resulting transcriptions that differ from the incorrect transcription, submitting the most common transcription to an electronic content search system for selecting electronic content corresponding to the most common transcription, and transmitting for display representations of the electronic content selected by the electronic content search system from the most common transcription.

10. A system for correcting errors in searches for electronic content resulting from incorrect transcriptions by an automated speech recognition system, the system comprising:
a storage device; and
control circuitry configured to:
for an incorrect transcription output by one or more automated speech recognition systems, successively submit terms associated with different subsets of terms of the transcription as hint words to the one or more automated speech recognition systems
generate a transcription output by the one or more automated speech recognition systems differs from the incorrect transcription, wherein the transcription output differs from the incorrect transcription in a first subset of the terms of the transcription generated using hint words based on terms in a second subset of the terms of the transcription different from the first subset of the terms of the transcription;
submit the generated transcription to an electronic content search system for selecting electronic content corresponding to the resulting transcription;
if none of the different subsets results in a resulting transcription different from the incorrect transcription, generate an error message and generating for display representations of the electronic content selected by the electronic content search system.

11. The system of claim 10, wherein the control circuitry is further configured to:

determine an occurrence of an improper search conducted by the electronic content search system; and determine whether the occurrence of the improper search resulted from the incorrect transcription.

12. The system of claim 11, wherein the determining an occurrence of an improper search further comprises determining the occurrence of an improper search according to one or more of:

whether no electronic content was selected by the electronic content search system as a result of the search;

whether electronic content selected by the electronic content search system as a result of the search has an associated relevance score less than a predetermined value;

whether the terms of the transcription are not connected or weakly connected in a knowledge graph of terms of the electronic content; or whether the terms of the transcription have popularity scores below a predetermined value.

13. The system of claim 11, wherein the determining that the occurrence of the improper search resulted from the incorrect transcription further comprises determining the presence of the incorrect transcription according to one or more of:

whether a transcription score of the transcription corresponding to the improper search is less than a predetermined value;

whether one or more terms of the transcription corresponding to the improper search have a homonym;

whether one or more terms of the transcription corresponding to the improper search have a corresponding pronunciation difficulty metric greater than a predetermined value;

a noise level of a query resulting in the transcription corresponding to the improper search;

whether one or more terms of the transcription corresponding to the improper search is a mispronounced term; or whether the transcription corresponding to the improper search comprises more than one term.

14. The system of claim 11, wherein the control circuitry is further configured to, if the electronic content search system did not generate an occurrence of the improper search, transmit for display representations of the electronic content selected by the electronic content search system.

15. The system of claim 11, wherein the control circuitry is further configured to conditionally perform the successively submitting if the electronic content search system generated an occurrence of the improper search and if the occurrence of the improper search resulted from the incorrect transcription.

16. The system of claim 11, wherein the control circuitry is further configured to, if the electronic content search system generated an occurrence of the improper search and if the occurrence of the improper search did not result from the incorrect transcription, generate an error message and transmitting for display representations of the electronic content selected by the electronic content search system.

17. The system of claim 10, wherein the successively submitting further comprises successively submitting the different subsets as hint words to the one or more automated speech recognition systems, until multiple ones of the resulting transcriptions differ from the incorrect transcription.

18. The system of claim 17, wherein the control circuitry is further configured to select a most common transcription of the resulting transcriptions that differ from the incorrect transcription, submit the most common transcription to an electronic content search system for selecting electronic content corresponding to the most common transcription, and transmit for display representations of the electronic content selected by the electronic content search system from the most common transcription.

* * * * *